United States Patent [19]

Blakeslee et al.

[11] 4,083,422
[45] * Apr. 11, 1978

[54] BOLT-ON GUIDANCE SYSTEM FOR LIFT TRUCK

[75] Inventors: Thomas R. Blakeslee, Woodside; James R. Francy, Los Gatos, both of Calif.

[73] Assignee: Logisticon, Inc., Sunnyvale, Calif.

[*] Notice: The portion of the term of this patent subsequent to Aug. 9, 1994, has been disclaimed.

[21] Appl. No.: 629,492

[22] Filed: Nov. 6, 1975

[51] Int. Cl.² .................................................. B62D 51/04
[52] U.S. Cl. ..................................... 180/98; 318/587; 318/618; 318/591
[58] Field of Search ................ 180/98, 79, 79.1, 77 R; 318/587, 576, 591, 611, 618

[56] References Cited

U.S. PATENT DOCUMENTS

| | | | |
|---|---|---|---|
| 2,317,400 | 4/1943 | Paulus et al. | 180/79.1 |
| 2,674,331 | 4/1954 | Ovshinsky | 180/79.1 |
| 3,003,363 | 10/1961 | DeHart | 180/77 R |
| 3,009,525 | 11/1961 | DeLiban | 180/98 |
| 3,039,554 | 6/1962 | Hosking et al. | 180/79.1 X |
| 3,235,024 | 2/1966 | Barrett | 180/79.1 |
| 3,244,250 | 4/1966 | Barrett | 180/79.1 |
| 3,245,493 | 4/1966 | Barrett | 180/98 |
| 3,431,996 | 3/1969 | Giles et al. | 180/98 |
| 3,468,391 | 9/1969 | Rushing | 180/98 |
| 3,482,644 | 12/1969 | Krieger et al. | 180/79.1 X |
| 3,498,403 | 3/1970 | Kohls | 180/98 |
| 3,557,893 | 1/1971 | Kohls | 180/79.1 |
| 3,667,564 | 6/1972 | Schnell | 180/79.1 |
| 3,669,205 | 6/1972 | Brooke | 180/79.1 |
| 3,669,208 | 6/1972 | Brooke | 180/79.1 |
| 3,738,443 | 6/1973 | Kubo | 180/98 |
| 3,935,922 | 3/1976 | Cooper et al. | 180/98 |

FOREIGN PATENT DOCUMENTS 435,079 9/1935 United Kingdom ................ 180/79

*Primary Examiner*—Joseph F. Peters, Jr.
*Assistant Examiner*—John P. Silverstrim
*Attorney, Agent, or Firm*—Limbach, Limbach & Sutton

[57] ABSTRACT

An automatic guidance device for a self-powered cargo-moving vehicle is bolted directly over the steering column of the vehicle and is operated by a vehicle-borne sensor which follows a magnetic wire path, the guidance system having an automatic, sensor-directed mode, a manually operated power steering mode, and a manual override mode in which the guidance device is effectively disconnected and steering is undertaken by a direct mechanical linkage with the vehicle steering column.

11 Claims, 15 Drawing Figures

FIG. 1
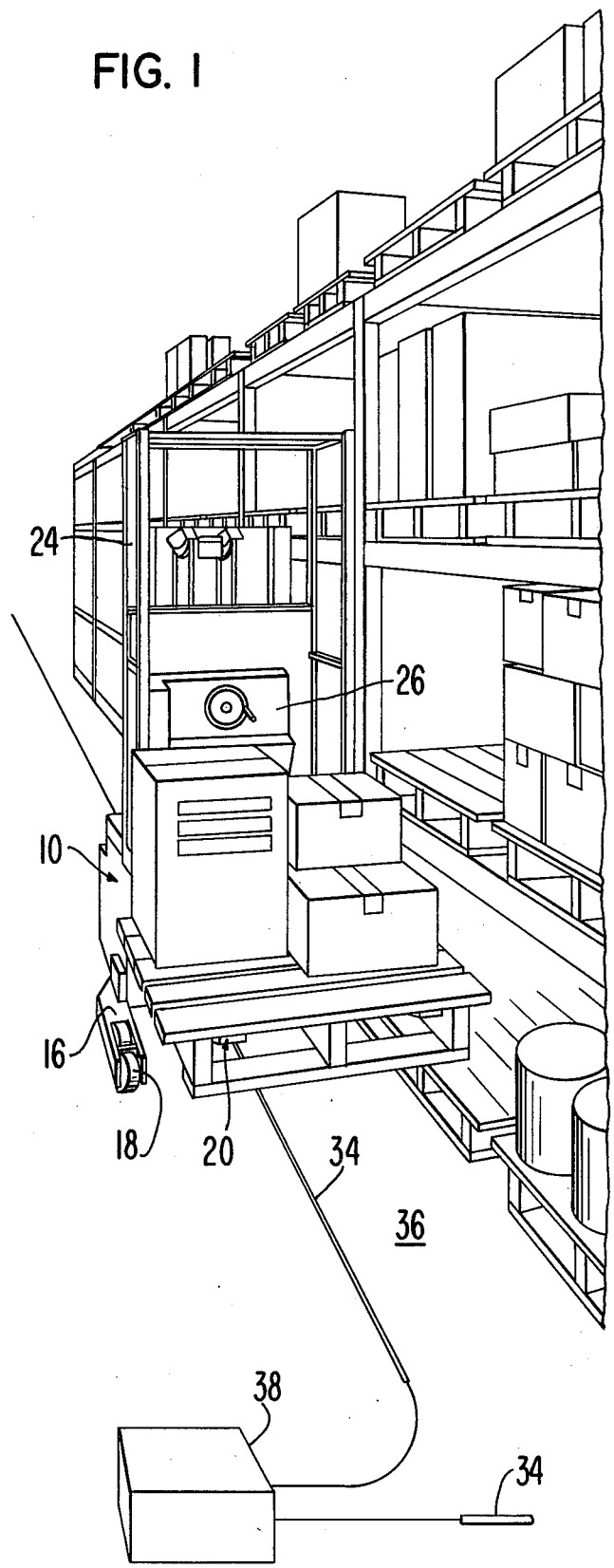
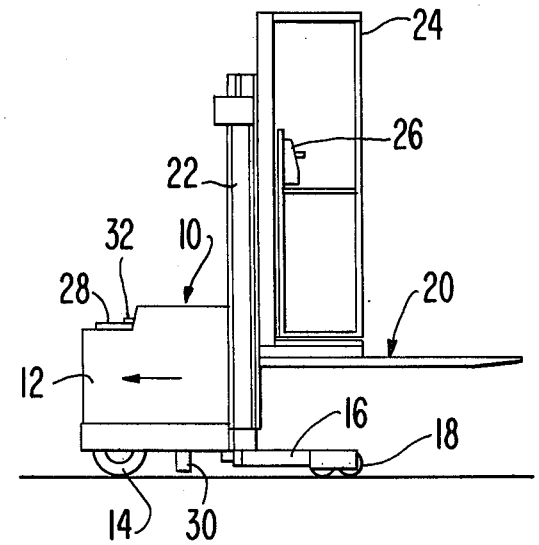
FIG. 2
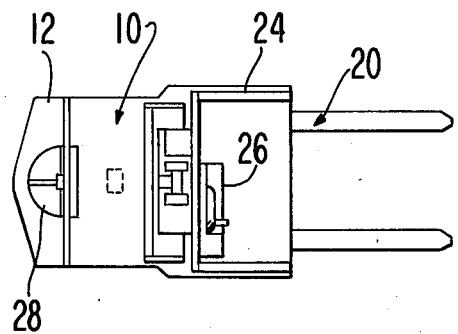
FIG. 3

BOLT-ON GUIDANCE SYSTEM FOR LIFT TRUCK

BACKGROUND OF THE INVENTION

The invention relates to guidance devices for self-powered vehicles and more particularly to a magnetic wire-following guidance device for an order picking vehicle or the like.

In the material handling industry, high-rise order picker vehicles (OPVs) permit narrow aisle storage and retrieval operations of non-palletized case or item storage. Such OPVs carry an operator on a lifting platform who picks orders from either a pallet or a storage module. The lifting platform incorporates the vehicle control so the operator can ride on the platform. The aisle widths are extremely narrow and may be as narrow as four feet. If the vehicle is guided other than by the operator down the aisle, it is safe for him to drive forward while the platform on which he is standing is being elevated. Otherwise, in non-guided aisles, the driver must first drive to the proper location and then activate the lift. This feature of moving forward while elevating, called "overlap" in the material handling industry, significantly improves operator productivity. Industrial safety codes in many states do not permit overlap unless the vehicles are guided in the aisle other than by the operator. OPV guidance, then, not only achieves increased storage capacity by minimizing aisle widths, but it also increases labor productivity by speeding up picking times.

There are basically two types of prior art guidance systems for OPVs. In the first type the OPV is mechanically guided. Rollers attached to the vehicle make contact upon aisle entry with steel rails bolted to the floor on either side of the aisle. The operator controls speed, stops and starts, and the vehicle is centered in the aisle mechanically. Although mechanical guidance systems offer economy and some degree of flexibility over the electronic guidance systems to be discussed hereinafter, the mechanical guidance systems have several important disadvantages.

In the mechanical guidance system the OPV is forceably pushed back into position by the rails, thus forcing the wheels to skid sideways. The massive forces involved in this operation tear up the wheels and cause continual rail maintenance problems due to snapped anchor bolts. In addition, since vehicle entry into a steel rail-guided aisle is performed by brute force, the constant physical contact results in broken end-of-aisle devices, broken vehicle guide rollers, and damaged rails and racks. Another common problem is that misjudging by the operator of the OPV's entry into steel rail-guided aisles can cause the load on the OPV to be disturbed with resultant injury to the vehicle or the operator, as well as the merchandise. Still another problem with mechanical guidance systems is that the end-of-aisle mechanical devices are relatively bulky and take up precious storage space. Furthermore, rubbish tends to collect under the racks behind the steel rails and is not removed or must be laboriously cleaned up by hand, adding to the operating costs of the storage facility.

Many of the above disadvantages of mechanically-guided OPVs are overcome by electronic guidance systems in which a wire is buried in the floor of the storage facility and specialized sensing positioning units are built into the OPV to follow along the buried wire. Such specially-built OPVs may run as much as $50,000 to $75,000, which is many times more expensive than mechanically-guided OPVs. Most of such electronic systems are completely automated, that is the vehicle is under automated control all of the time. Because of this enormous expense, mechanical guidance, at the present time, has nearly all of the OPV guidance market. One advantage of electronic guidance is that it minimizes vehicle down time and maintenance expense due to mechanical damage to equipment. This is because in the electronic guidance system, the OPV is actually steered down the aisle rather than being mechanically forced into position.

Heretofore, it has not been feasible to modify existing OPVs for electronic guidance because such modification would require either substantial changes to the basic vehicle frame in order to make room for the steering servo package or the OPV would have to be specially designed around the guidance package. Both of these modifications would be quite expensive, and furthermore, could very easily void the vehicle's OSHA certification.

SUMMARY OF THE INVENTION

The above and other disadvantages of prior art guidance systems for OPVs are overcome by the present invention of an automatic guidance device for a self-powered, cargo moving vehicle of the type having a ground-engaging steering wheel and some means, such as a rotatable steering column, for manually positioning the ground-engaging steering wheel to direct the course of the vehicle. The guidance device of the present invention comprises fixed-course defining means external to the vehicle, such as a buried signal wire, motor driver means fitted over a portion of the steering column for rotating the steering column in response to a steering control signal, and sensor means for sensing the course-defining means and generating an error signal representative of the deviation of the vehicle from the course-defining means. A directional-control circuit responsive to the error signal generates the steering control signal to the motor driver means to cause it to rotate the steering column in a direction which makes the vehicle follow the course-defining means.

In one preferred embodiment, the guidance control also includes manually-operable means for generating a power steering control signal. The steering control signal from the directional control circuit is representative of the error signal whenever the error signal exceeds a predetermined magnitude and is representative of the power steering control signal at all other times.

Thus, in the present invention, the guidance system is bolted on to an existing, standard OPV simply by dismounting the steering wheel from the steering column of the OPV, mounting the guidance system over the end of the steering column, and bolting it to the OPV. The sensors are then attached to the bottom of the OPV at a location where they will normally straddle the buried wire. Another sensor is also attached to the guiding ground-engaging wheel so that its relative angular position with respect to the OPV is also known to the electronic guidance circuit. In a "Manual" mode the operator is able to power steer the OPV by turning a steering wheel mounted on the guidance system, which generates the power steering signal to the directional control circuit of the guidance device in the same manner in which the electronic sensor is used to make the OPV follow the wire in an "Auto" mode.

In operation, the driver manually directs the OPV to the beginning of the aisle entry and then pushes the steering wheel into the "Auto" position to cause the guidance circuit to detect the polarity and slope of the reference signal from the buried wire. As soon as the polarity and slope of the reference signal reaches a predetermined value, indicating that the OPV has either crossed over the wire and is heading away or has approached the wire and is heading away, the control circuit automatically disconnects the power steering signal and switches over entirely to sensor control. From this point on, the OPV is under automatic control and follows the buried wire down the aisle.

In the preferred embodiment of the invention, provision is made for situations where, because of emergency, for example, the operator may wish to override the entire system and take direct mechanical control of the steering of the OPV. In this embodiment, the operator merely pulls out on the steering wheel to cause it to mechanically engage the steering column and to electronically disconnect the control guidance circuit. The operator can then directly and mechanically control the steering of the vehicle without the use of the guidance device.

There are many advantages to the guidance system of the present invention. One advantage is that it has a low initial capital investment for the user. There is reduced damage to the equipment because there are no rails or rollers, such as in the mechanical-guidance system. Because it is an electronic guidance system, and therefore has less vibration and mechanical rattling, there is reduced damage to merchandise and to operators. Because of the increased accuracy of this system, the aisle space may be made even narrower than in some mechanical systems. A storage facility equipped with the guidance system of the present invention is much easier to clean because there are no projecting rails to interfere with floor cleaning operations. The guidance system of the present invention has all the flexibility of mechanical guidance systems in that all that needs to be done to extend its operation is to lay more buried wire.

In the applicant's system the OPV does not have to be adjacent the entry into the aisle in order to engage the automatic guide. When an operator is maneuvering an OPV which carries a full load, thereby having limited operator visibility, he can make the OPV acquire the buried wire several feet back from the aisle entry. As the OPV enters the aisle it has already been aligned and doesn't come close to the racks or bins which constitute the aisle. Operator productivity is greatly increased with the present invention. Since the guidance device automatically guides the OPV into the aisle, the operator spends less time aligning and steering the OPV.

One great advantage of the applicant's guidance system over either mechanical guidance systems or existing state of the art electronic guidance systems is that it can quickly and easily convert a manually-steered OPV to electronic guidance without jeopardizing the OPV's OSHA certification. This is possible because very little modification need be made to the basic OPV to adapt it.

It is, therefore, an object of the present invention to provide an electronic guidance system for a conventional order-picking vehicle;

It is another object of the invention to provide a low cost electronic guidance system for an order-picking vehicle;

It is still another object of the invention to provide a bolt-on electronic guidance system for a conventional order-picking vehicle; and It is a still further object of the invention to provide an electronic guidance system for an order-picking vehicle which allows a sensor controlled mode of steering, a power steering mode, and a manual override mode.

The foregoing and other objects, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a perspective view of an order-picking vehicle equipped with a guidance system according to the present invention;

FIG. 2 is a side-elevational view of an order-picking vehicle equipped with the guidance system of the invention;

FIG. 3 is a top plan view of the OPV depicted in FIG. 2;

DETAILED DESCRIPTION OF THE PREFERRED EMBODIMENT OF THE INVENTION

Figure 4:
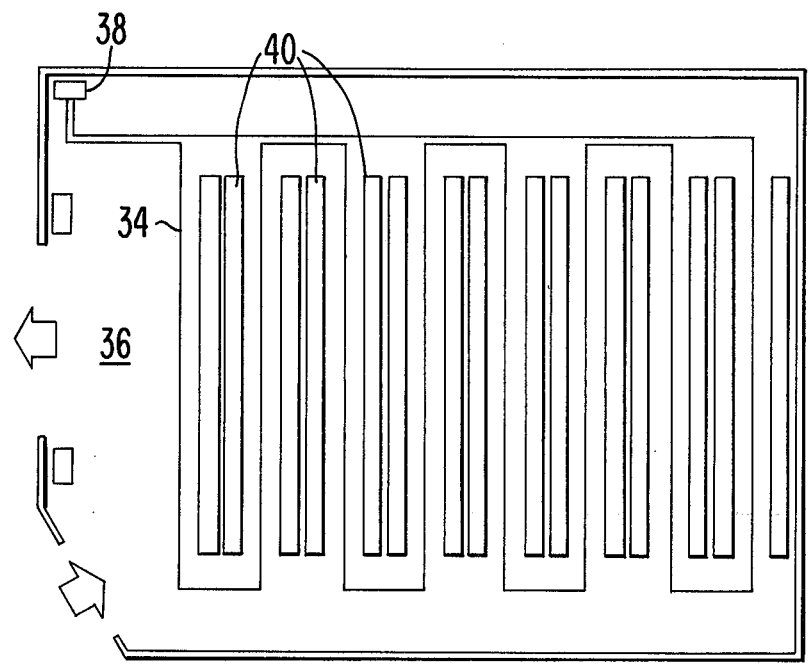
FIG. 4 is a plan view of the buried wire guide path of the invention.
Figure 5:
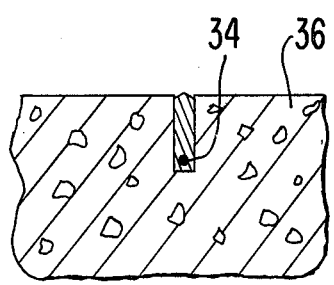
FIG. 5 is a vertical sectional view of a portion of the buried wire guide path depicted in FIG. 4.

Referring now more particularly to FIGS. 1, 2, 3 and 4, the basic order-picking vehicle 10 utilized in the guidance system of the invention is of a conventional type. It has a rear portion 12 which houses the motor and storage batteries which drive the order-picking vehicle. As viewed in FIG. 2, the leftmost wheel is a ground-engaging guide wheel 14 which is pivotable in a horizontal plane about a vertical axis and which is driven by the motor within the housing 12. A pair of horizontally spaced-apart members 16 extend from the righthand end of the OPV, as viewed in FIG. 2, and each supports a pair of ground-engaging roller wheels 18. A forklift assembly 20 is supported on a vertical rack 22 extending above the horizontal members 16. The forklift assembly 20 includes an operator cubicle 24 and a control console 26 mounted within the cubicle 24. The forklift mechanism 20 is raised and lowered on the rack 22 under the operator'control by conventional means which will, therefore, not be described in further detail. The angular alignment of the ground-engaging steering wheel 14 is depicted visually above the OPV 10 by a rotatable indicator 28 on top of the rear housing 12.

In a conventional OPV the guide wheel 14 is manually pivoted to steer the vehicle by means of a steering wheel (not shown) mounted on the end of a steering column shaft 52 (FIG. 7) which is connected to the guide wheel by a conventional sprocket chain and steering gear assembly (not shown).

The description of the OPV 10 to this point has been of a conventional OPV. To modify the OPV 10 for the guidance system of the present invention, a sensing coil assembly 30 is mounted on the bottom surface of the OPV between the wheels 14 and 18 and along the axis of symmetry of the OPV 10. A second sensor 32 is mounted on top of the indicator 28 to sense the angular position of the indicator 28. The OPV 10, when operating in the automatic guidance mode, straddles a buried wire 34 in the floor 36. The wire 34 is connected to a 6.3KHz line driver unit 38 which sends high frequency signals along the wire 34. As will be explained in greater detail hereinafter, the OPV 10 when operating in the automatic guidance mode is centered over the wire 34 and the sensing coil assembly 30, straddling the wire, picks up the wire signals and feeds them to an electronic guidance system. The guidance system, through a motorized unit to be described in greater detail hereinafter, rotates the ground-engaging steering wheel 14 through the conventional shaft 52 in a manner so as to steer the OPV 10 along the wire 34.

The layout of the wire 34 in a typical installation is depicted in FIG. 4, which shows the wire 34 serpentined through a plurality of storage aisles 40. The OPV 10 is manually power steered, in a manner to be described in greater detail hereinafter, into the storage facility until it approaches the wire 34 at which point the operator switches the guidance mechanism to its automatic mode as it is approaching the wire 34. When the OPV has either passed over the wire 34 and is heading away from it, or has come relatively close to the wire 34 and is heading away from it, the guidance system will electronically lock onto the wire and guide the OPV over the wire 34 and down between the storage aisles 40 until the operator stops the OPV 10.

Figure 6:
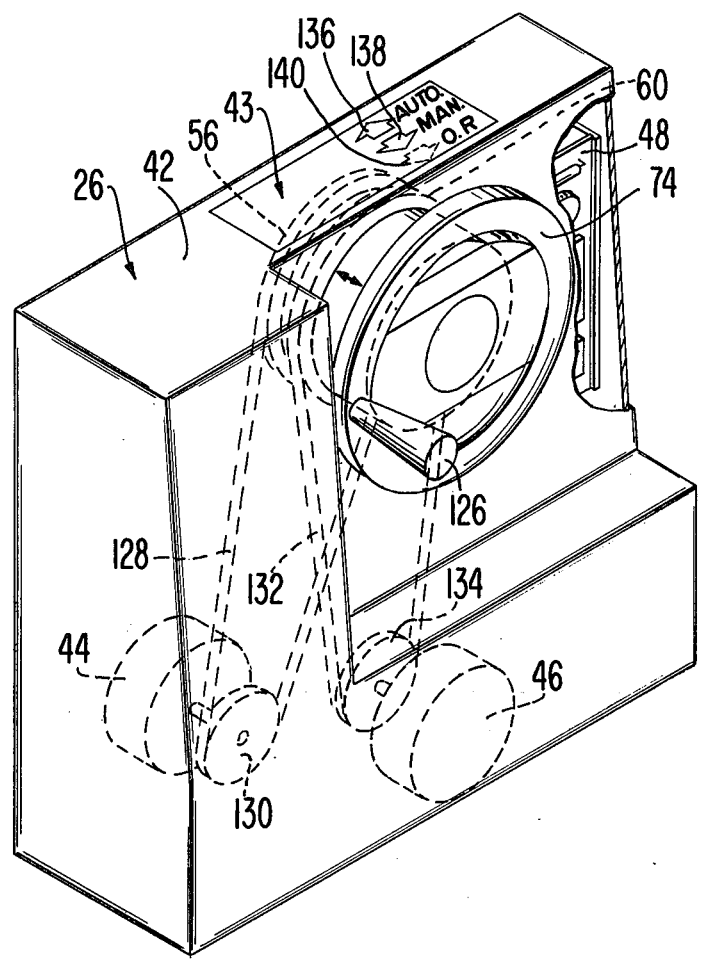
FIG. 6 is an enlarged perspective view, with portions broken away, of the control console of the guidance system of the invention.
Figure 7:
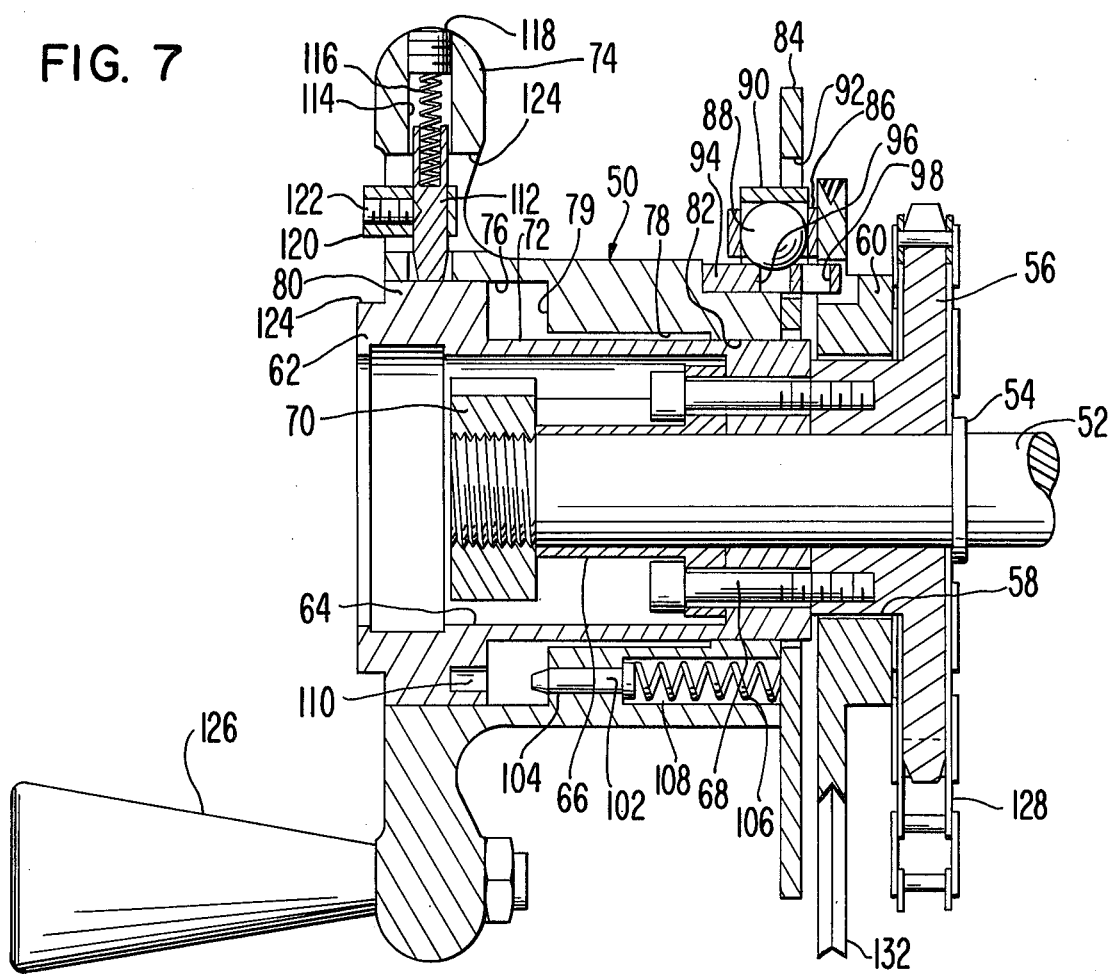
FIG. 7 is an enlarged view in section and partially in elevation depicting the steering wheel assembly of the invention.

Referring now more particularly to FIGS. 6 and 7, the control console 26 will be described in greater detail. The control console 26 is comprised of a housing 42 for a steering motor 44, a power steering tachometer 46 and the electronic guidance printed circuit 48. A handwheel 74 projects from the outer surface of the housing 42. In order to facilitate turning the handwheel 74 it is provided with a longitudinally projecting handle 126 which is bolted to the outer rim of the handwheel 74. Not shown are the conventional controls for starting and stopping the OPV and for raising and lowering the forklift.

A steering wheel assembly 50 according to the invention is fitted onto the conventional steering column shaft 52 of the OPV 10 after removing the conventional manual steering wheel (not shown) from the end of the shaft 52. The shaft 52 is provided with an enlarged diameter section 54 against which the steering wheel assembly 50 abuts.

The steering wheel assembly is comprised of a steering sprocket gear 56 which is positioned on the shaft 52 adjacent the shoulder or enlarged diameter portion 54 of the shaft. On the side of the sprocket gear 56 opposite to the shoulder 54 the gear 56 has a reduced diameter portion 58 over which is fitted a rotatable pulley 60. The pulley 60 rides entirely on the reduced diameter portion 58 of the steering sprocket gear 56. An override clutch hub 62 is next fitted onto the shaft 52 and is positioned adjacent to the reduced diameter portion 58 of the sprocket gear 56. The clutch hub 62 has an enlarged bore 64 at its left-hand end, as viewed in FIG. 7, which accommodates a cylindrical coupler member 66 fitted onto the shaft 52. The coupler 66 is bolted by means of bolts 68 passing through the clutch hub 62 to the reduced diameter portion 58 of the sprocket gear 56. A hex nut 70 is threaded onto the end of the shaft 52 and bears against the left-hand edge, as viewed in FIG. 7, of the coupler 66 to hold the assembly 50 on the shaft 52 against the shoulder 54. Although not shown in FIG. 7, the sprocket gear 56 and the coupler 66 are keyed to the shaft 52 to rotate with it. Because of the bolts 68, the clutch hub 62 likewise rotates with the shaft 52.

The clutch hub 62 is cylindrical and has a reduced outer diameter portion 72 forming a shoulder 80 at the left-hand end of the clutch hub 62, as viewed in FIG. 7. A handwheel 74 is fitted over the clutch hub 62. The left end of the handwheel 74 in FIG. 7 has an axial bore 76 which is rotatably fitted and in sliding contact with the outer diameter of the hub shoulder 80. The handwheel 74 is also provided with a reduced diameter bore 78 only slightly larger than the reduced, exterior diameter portion 72 of the clutch hub 62. The reduced diameter bore 78 of the handwheel 74 forms a shoulder 79 which abuts against the hub shoulder 80. This prevents the handwheel 74 from sliding off of the clutch hub 62.

The axial bore of the handwheel 74 has a still further reduced diameter portion 82 which is rotatably fitted over the surface of the reduced diameter portion 72 of the clutch hub 62 and in sliding contact with it. A switch actuator plate 84 is attached by bolts (not shown) to the right-hand end of the handwheel 74, as viewed in FIG. 7. The diameter of the switch actuator plate 84 is about two-thirds of the diameter of the handwheel 74 and exceeds the diameters of the pulley 60 and the sprocket gear 56.

At the outer circumference of the pulley 60 and on its left-hand side as viewed in FIG. 7, there is attached a ball detent support 86, having an interior bore in which a ball 88 is positioned. The ball 88 is prevented from escaping upwardly, as viewed in FIG. 7, by a resilient leaf spring 90 which is also attached by a suitable mounting bracket (not shown) to the pulley 60. The ball bracket 86, the ball 88, and the spring 90 project through an aperture 92 in the switch plate 84. The steering wheel 74 carries a plate detent member 94 on its outer circumference and at its right-hand end, as viewed in FIG. 7. The plate detent 94 has two holes 96 and 98 which are positioned to alternately engage the ball 88, depending on the longitudinal position of the handwheel 74 along the shaft 52 with respect to the pulley 60.

Figure 13:
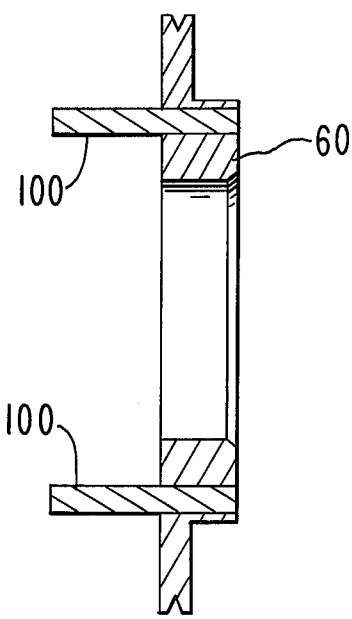
FIG. 13 is an enlarged vertical view, in section, of the power steering pulley component of the steering wheel assembly depicted in FIG. 7, when rotated 90° from the position shown in FIG. 7.

Referring now more particularly to FIG. 13, it can be seen that the pulley 60 has a pair of metal dowel pins 100 which are spaced 180° apart and which are force fitted into bores within the pulley 60. The pins 100 project from the side of the pulley 60 which faces the handwheel 74 and are radially positioned so as to be receivable in bores within the handwheel 74 (not shown). Thus, by means of the pins 100, the pulley 60 will always rotate with the handwheel 74 without regard to the longitudinal position of the handwheel 74 along the shaft 52.

As was briefly described above, in one mode the operator may override the guidance device and take direct, manual, mechanical control of the steering of the OPV 10. To do this, the operator need only pull the handwheel 74 to the left, as viewed in FIG. 7, that is, outwardly toward the operator so as to bring the handwheel shoulder 79 into engagement with the clutch hub shoulder 80. To rotatably lock the handwheel 74 to the clutch hub 62, the handwheel shoulder 79 has five recessed pins 102 fited into axial bores 104, which are parallel to the shaft 52. The pins 102 project beyond the handwheel shoulder 79 into the enlarged diameter bore 76. The pins 102 are each resiliently held in this position by one end of a compression spring 106 fitted into an enlarged portion of each bore 108. The other end of each spring 106 is held in place by the switch actuator plate 84. The pins 102 are radially spaced at 72° inervals around the interior of the handwheel 74. On the clutch hub shoulder 80 at the surface opposite to the projecting pins 102 are six radially spaced bores 110 for receiving the projecting ends of the pins 102. The bores 110 are thus spaced at approximately 60° intervals.

By this arrangement of five pins 102 and six bores 110, the handwheel 74 is brought into almost immediate rotational engagement with the clutch hub 62 when the handwheel 74 is slid outwardly on the shaft 52 because only about 12° of rotational travel need take place before the end of one of the pins 102 slides into one of the bores 110 to effectively lock the handwheel 74 rotationally to the shaft 52.

To lock the handwheel longitudinally to the clutch hub, the rim of the handwheel includes a locking pin 112, slidable in a radial bore 114 in the handwheel 74. The bore 114 is open ended to the reduced diameter bore 76 and the pin 112 is pushed out of the bore 114 by a compression spring 116 held in place in the bore 114 by a set screw 118 in the outer circumference of the handwheel 74. The pin 112 is prevented from being pushed completely out of the bore 114 by a thumb button 120 fastened to the pin 112 by a set screw 122. The thumb button 120 projects horizontally, as viewed in FIG. 7, outwardly from the handwheel 74 in a horizontal bore 124. The radially innermost end of the pin 112 normally abuts the shoulder 80 of the clutch hub 62. In the manual override position, however, the innermost end of the pin 112 abuts against a reduced diameter shoulder 124 at the outermost end of the clutch hub 62 to effectively lock the handwheel 74 longitudinally in the manual override position on the clutch hub 62. In order to return the handwheel 74 to the "Auto" or "Manual" power steering mode, it is necessary that the operator lift up the thumb button 122 to slide the pin 112 back into its bore 114, so that it clears the shoulder 124.

The sprocket gear 56 carries a sprocket chain 128 which passes around a corresponding sprocket gear 130, as best seen in FIG. 6 in hidden view, on the motor shaft of the steering motor 44. A V-belt 132 passes around a corresponding V-groove on the pulley 60 and connects the pulley 60 with a similar V-grooved pulley 134 on the end of the shaft of the tachometer 46. As will be explained in greater detail hereafter, when the control unit 26 is operating in the automatic or sensor mode, the handwheel 74 is pushed to its innermost position on the shaft 52, that is it is pushed to the right as viewed in FIG. 7. In this position, assuming that the OPV 10 is centered over the buried wire 34, the electronic system will light an indicator LED 136 at the top of the console 43 which bears the legend "AUTO" In "AUTO" mode, assuming that the sensor circuit has "acquired" the buried wire 34, the electronic guidance circuit alone operates the steering motor 44 and thus the steering column 52 through the sprocket chain 128 and the sprocket gear 56. Until the wire is acquired, however, the operator continues to power steer the OPV.

When the operator wishes to take sole control of the steering of the OPV 10, he need only slide the handwheel 74 to an intermediate position as represented by the detent 98 in the detent plate 94. The sensor control of the steering circuit is then disconnected and the output of the electronic tachometer 46 is fed directly to the steering control circuit to provide a directional control signal to the steering motor 44. The rotation of the steering wheel 74 and pulley 60 causes the V-belt 132 to rotate the pulley 134 and thereby generate an electric signal whose magnitude is representative of a predetermined number of rotations of the steering motor 44. This will cause the steering motor 44 to rotate the steering column 52 through the sprocket gears 130 and 56 and the sprocket chain 128 to turn the OPV 10 in the desired direction by the desired amount. In this power steering or manual mode the top console indicator lights a "MAN"LED 138.

As described above, in the override mode the operator pulls the handwheel 74 as far out on the shaft 52 as it can go to thereby make a direct mechanical linkage to the steering column 52. An indicator LED 140 labeled "O.R." is energized to show that the guidance of the OPV 10 is strictly mechanical.

Figure 8:
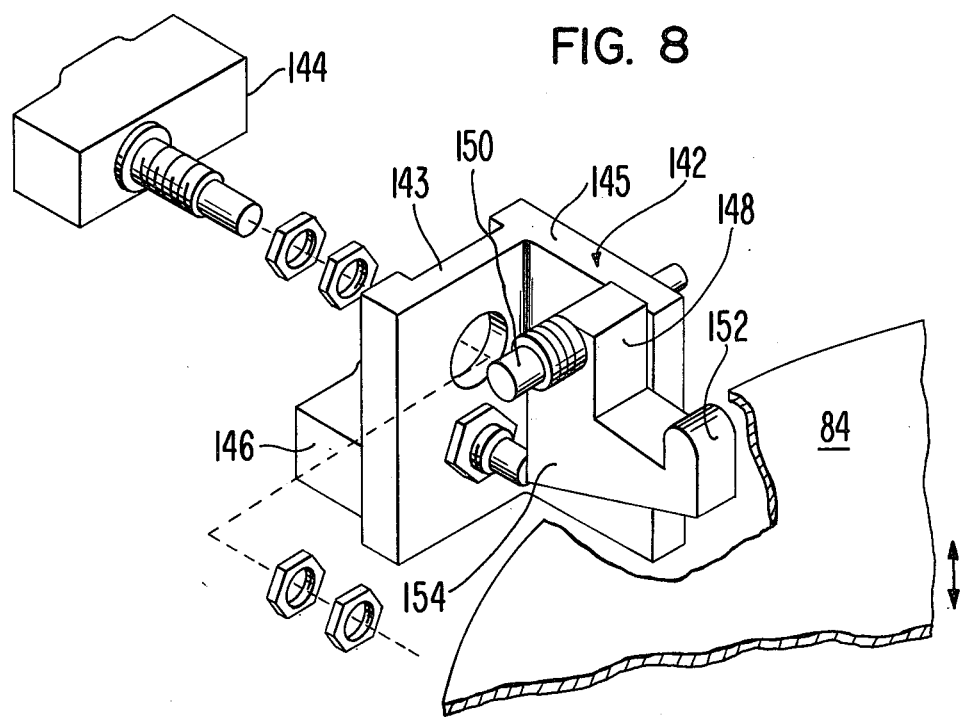
FIG. 8 is an enlarged perspective, partially exploded view of the mechanical switching component of the steering wheel assembly depicted in FIG. 7.

Referring now more particularly to FIG. 8, the mechanical actuation of the guidance mode switches will be described. Two push button switches 144 and 146 are mounted in holes in one leg 143 of the L-shaped bracket 142 so that their push buttons protrude into the right angle space contained by the legs 143 and 145 of the bracket 142. The switches 144 and 146 are mounted in vertical alignment with the switch 146 being lowermost as viewed in FIG. 8. An elbow shaped actuator 148 is pivotally mounted at the end of one of its legs by a shaft 150 to the top of the bracket leg 145. The actuator 148 pivots within the right angle space contained by the bracket legs. The other leg of the actuator 148 is positioned to be contacted by the actuator plate 84 of the wheel assembly 50.

The upper portion of elbow 154 of the actuator 148 is positioned to contact the push button of the switch 144 when the actuator 148 is rotated clockwise, as shown in FIG. 8. The lower portion of elbow 154 is positioned to contact the push button of the switch 146 as the actuator is further rotated clockwise as viewed in FIG. 8. The actuator 148 is caused to rotate clockwise when the plate 84 is moved in an downward direction as viewed in FIG. 8, corresponding to movement to the right in FIG. 7. As the actuator 148 is pivoted clockwise it first closes the switch 144 and as the plate 84 moves still further in the same direction, the switch 146 is operated. The switch 146 is a single pole, double throw switch which controls the switching from the manual to automatic modes. The switch 144 is a normally open, single pole, single throw switch which disconnects the power to the guidance system when the manual override mode is selected by the operator.

Figures 9, 10:
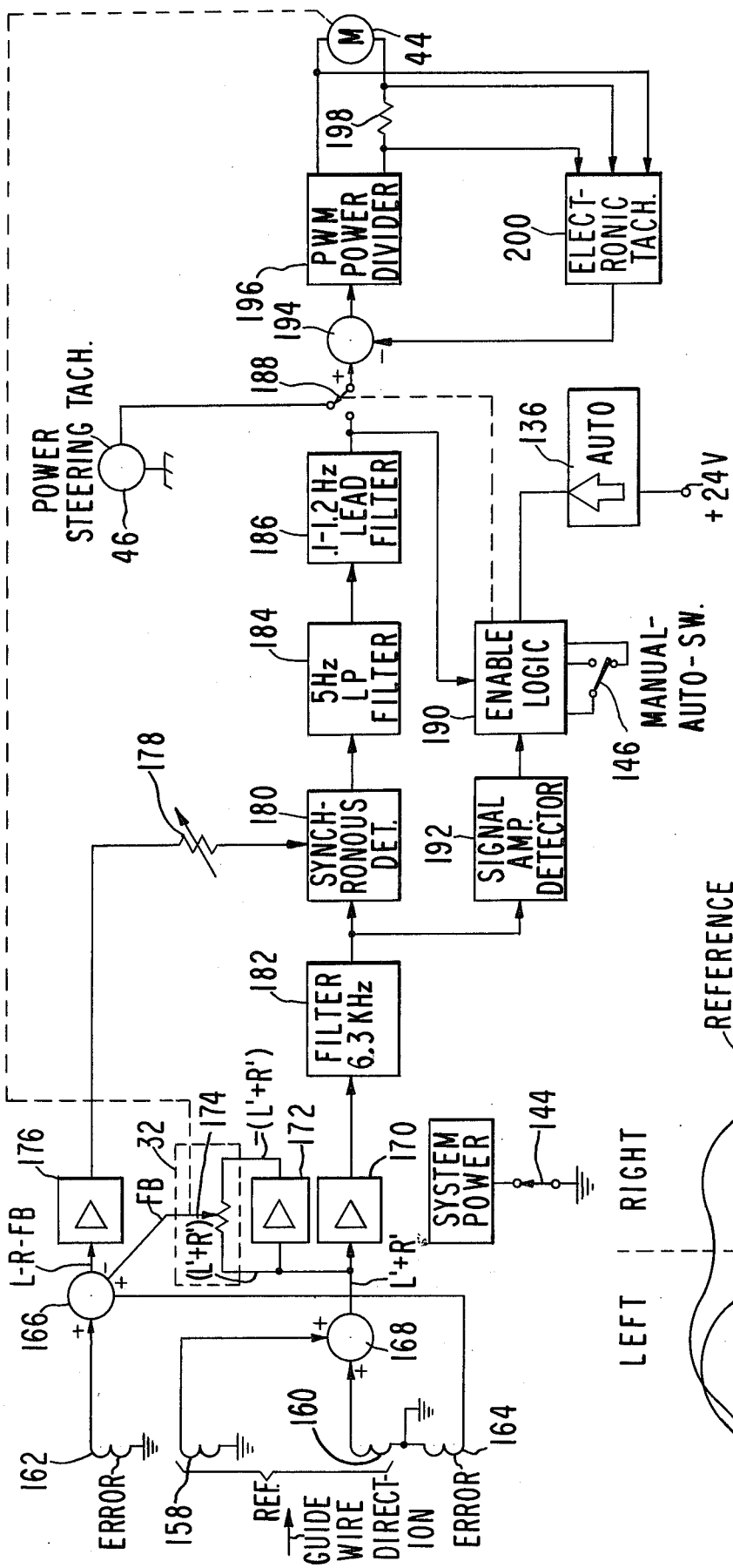
FIG. 9 is a schematic block diagram of the electronic control of the guidance system of the invention.
FIG. 10 is the waveform diagram of the sensor coil outputs of the guidance system depicted in FIG. 9.
Figure 14:
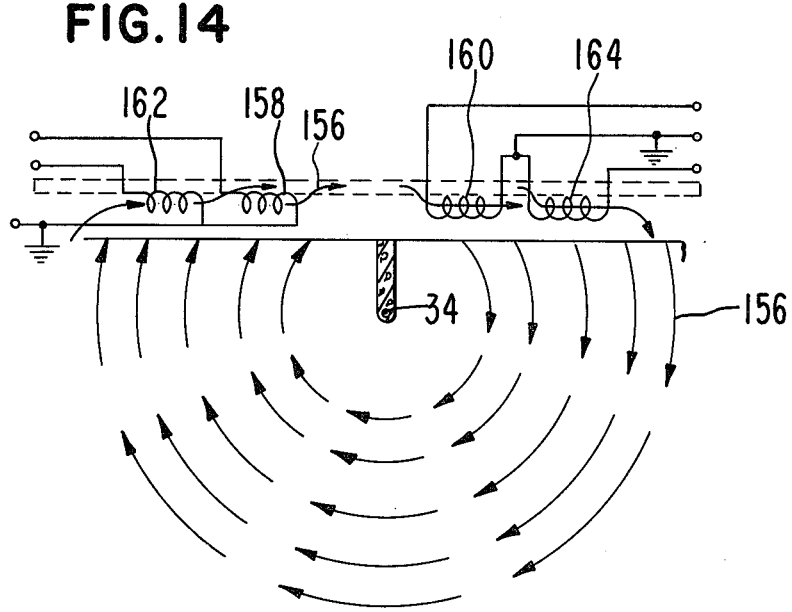
FIG. 14 is an enlarged diagrammatic view of the sensor coil arrangement of the invention.

Referring now more particularly to FIGS. 9, 10 and 14 the electronic portion of the guidance device of the present invention will be described in greater detail. The electromagnetic field transmitted by the alternating current traveling through the buried wire 34 is distributed radially along the wire as is illustrated by the magnetic flux lines 156 in FIG. 14. The magnetic coil sensors carried by the OPV 10 comprises a pair of right and left reference coils 158 and 160 and a pair of right and left error coils 162 and 164, respectively. The terms right and left are taken in FIG. 14 as through the observer were standing behind the coils looking out of the page and in FIG. 9 as though standing behind the coils and looking towards the direction of travel (left). The reference coils 158 and 160 are spaced apart by approximately 8 inches, that is they are each approximately 4 inches horizontally from the buried wire 34. The error coils 162 and 164 are spaced approximately 14 inches apart, that is 7 inches horizontally from the buried wire 34.

Figure 15:
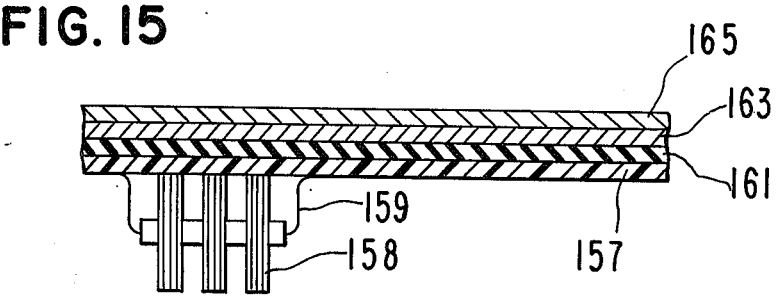
FIG. 15 is an enlarged vertical view, partly in section and with portions broken away, of the sensor coil assembly depicted in FIG. 14.

Referring to FIG. 15, the construction of the coil assembly is illustrated in greater detail. The coils, such as coil 158, are all mounted horizontally on a printed circuit board 157 by their leads 159. The coil leads are interconnected by the printed circuit in a manner to be described below. The side of the board 157 opposite to the coils is pressed hard against an assembly of sheets comprised of a sheet of rubber 161 ⅛inch thick, a 2-inch wide strip 163 of mu metal which is 0.006inch thick, and a ⅛inch thick strip 154 of cold rolled steel. The mu metal strip 163 provides a low reluctance, horizontal return path for the lines of flux 156 from the guide wire 34. This makes it possible to have a very thin sensor package. In one embodiment the sensor coils are 50 mHy. R.F. choke coils.

One side of each of the coils is connected to the circuit ground and their other leads are combined as follows. The coils 162 (output "L") and 164 (output "R") are wound so as to be opposite in phase and their ungrounded leads are connected to add their outputs (L,-R) in a summing junction 166. Because of the 180° phase relationship the resultant sum of these two signals is labeled L-R. The outputs L' and R' from the two reference coils 158 and 160, respectively, are added together in a summing junction 168 whose output is labeled "L'+R'" on the figure. This L'+R' output is fed to the input of an operational amplifier 170, to the input of an inverting amplifier 172 and to one arm of a potentiometer 174. The output of the inverting amplifier 172, which output is labeled "−(L'+R')", is fed to the other arm of the potentiometer 174. The movable contact of the potentiometer 174 is mechanically connected to the ground engaging steering wheel 14 as represented by the dashed line to the motor M in FIG. 9. Thus the angular orientation of the ground engaging steering wheel 14 is reflected in the position of the movable contact arm of the potentiometer 174. The potentiometer 174 together with the mechanical linkage indicated in dashed line form as being connected to the motor 44 actually represents the sensor 32 mounted on the indicator 28 on the back of the OPV housing 12.

If the ground engaging steering wheel 14 is turned to the right as far as it will go the movable contact arm of the potentiometer 174 will be moved to the position where it receives the signal −(L'+R'). If the ground engaging steering sheel is turned as far as it will turn to the left the movable contact arm of the potentiometer 174 will be at the opposite end to receive the signal (L'+R'). The signal output from the movable contact arm is labeled FB, because it is a negative feedback signal, and this signal FB is subtracted at the summing junction 166. The output of the summing junction is thus L-R-FB. This signal is supplied to the input of an operational amplifier 176.

The amplifier signal L-R-FB from the output of the amplifier 176 is fed through a loop gain variable resistance 178 to one input of a synchronous detector 180. The amplified signal L'+R' from the output of the amplifier 170 is fed through a 6.3 KHz filter 182 to another input of the synchronous detector 180. The synchronous detector detects signals which are coherent to the reference signal, that is when the reference signal is less than 180° out of phase with the error signal the synchronous detector integrates the error signal L-R-FB. When the reference signal is more than 180° out of phase with the error signal the synchronous detector inverts and integrates the error signal L-R-FB. In this way spurious noise signals are averaged out to nothing. The output from the synchronous detector 180 is a DC signal whose magnitude is representative of the positon error of the OPV 10 and whose polarity indicates on which side of the wire the OPV 10 is positioned. This output is fed through a 5 Hz low pass filter 184 to filter out any high frequency pulses and the output of the filer 184 is fed to a 0.1-1.2 Hz lead filter which introduces an approximately 60° lead in phase to prevent oscillation in the feedback loop. The output from the lead filter 186 is fed to one terminal of a single pole double throw electronic switch 188.

The other terminal of the switch 188 is connected to the power steering tachometer 46. The output of the lead filter 186 is also supplied to an enable logic circuit 190. Another input to the enable logic circuit 190 is from the output of a signal amplitude detector 192 whose input is supplied from the 6.3 KHz filter 182.

The purpose of the enable logic circuit 190 is to determine when the guidance system has "acquired" the buried wire 34. The output of the signal amplitude detector 192 represents a threshold signal which is simply an amplified version of the reference signal L'+R'. This threshold signal together with the signal from the lead filter 186 allows the enable logic circuit 190 to detect whether the signal is strong enough to guide the circuit and, from the signs of the slope and the polarity of the error signal whether or not the OPV 10 has either crossed over the wire and is heading away from it or has closely approached the wire and is heading away from it.

Referring more particularly to FIG. 10 a waveform graph of the reference signal L'+R' and the error signal L−R is depicted with respect to the buried wire 34. As is readily apparent from the figure the reference signal has a slight dip in amplitude when the OPV 10 is centered over the buried wire 34. The error signal undergoes a zero crossing when the OPV 10 is centered over the wire 34. When the error signal and the reference signal lie on the same side of the abcissa they are in phase and when the error signal is on the opposite side of the abcissa the error and reference signals are out of phase. At the point where the OPV 10 is about to cross the wire the polarity of the output of the synchronous detector is changing from one polarity to another and the slope of the error signal is approaching zero. It is this condition which triggers the enable logic circuit 190 to activate the electronic switch 188 to connect the output of the lead filter 186 to the plus input of a summing junction 194. Until this condition is reached, the enable logic circuit 190 connects the power steering tachometer to the plus input of the summing junction 194. The manual-auto switch 146 is also connected to the enable logic circuit 190, thereby allowing the operator to manually cause the switch 188 to connect the power steering tachometer 46 to the summing junction 194 when the handwheel 74 is in its intermediate position. The enable logic circuit 190 also lights the "Auto" light 136 when the switch 188 is in the position connecting the lead filter 186 to the summing junction 194.

The output of the summing junction 194 goes to a pulse width modulated power driver circuit 196. The outputs of the power driver 196 is a series of pulses whose width is proportional to the magnitude of the error signal and whose polarity corresponds to the polarity of the output signal from the synchronous detector 180, that is the polarity is dependent upon which side of the buried wire 34 the OPV 10 is standing. One output lead from the power driver 196 is fed directly to the motor 44. The other output lead is fed to the motor 44 through a low resistance 198. An electronic tachometer 200 has three inputs which are connected to the output of the power driver 196 and the motor 44 so as to be able to sense both the voltage drop across the motor 44 and the voltage drop across the resistance 198. The motor 44 in effect acts like a generator. By knowing how much of the voltage drop across the motor is due to resistance losses in the armature it is possible by sensing the current through the motor, as represented by the voltage drop across the resistor 198, to calculate the true back EMF generated by the motor 44. This information is calculated in the electronic tachometer in analog fashion to produce a feedback signal which is subtracted at the junction 194. This negative feedback signal provides a damping to prevent the motor from oscillating due to overshoot which might otherwise occur because of the major negative feedback loop through the potentiometer 174.

Figure 11:
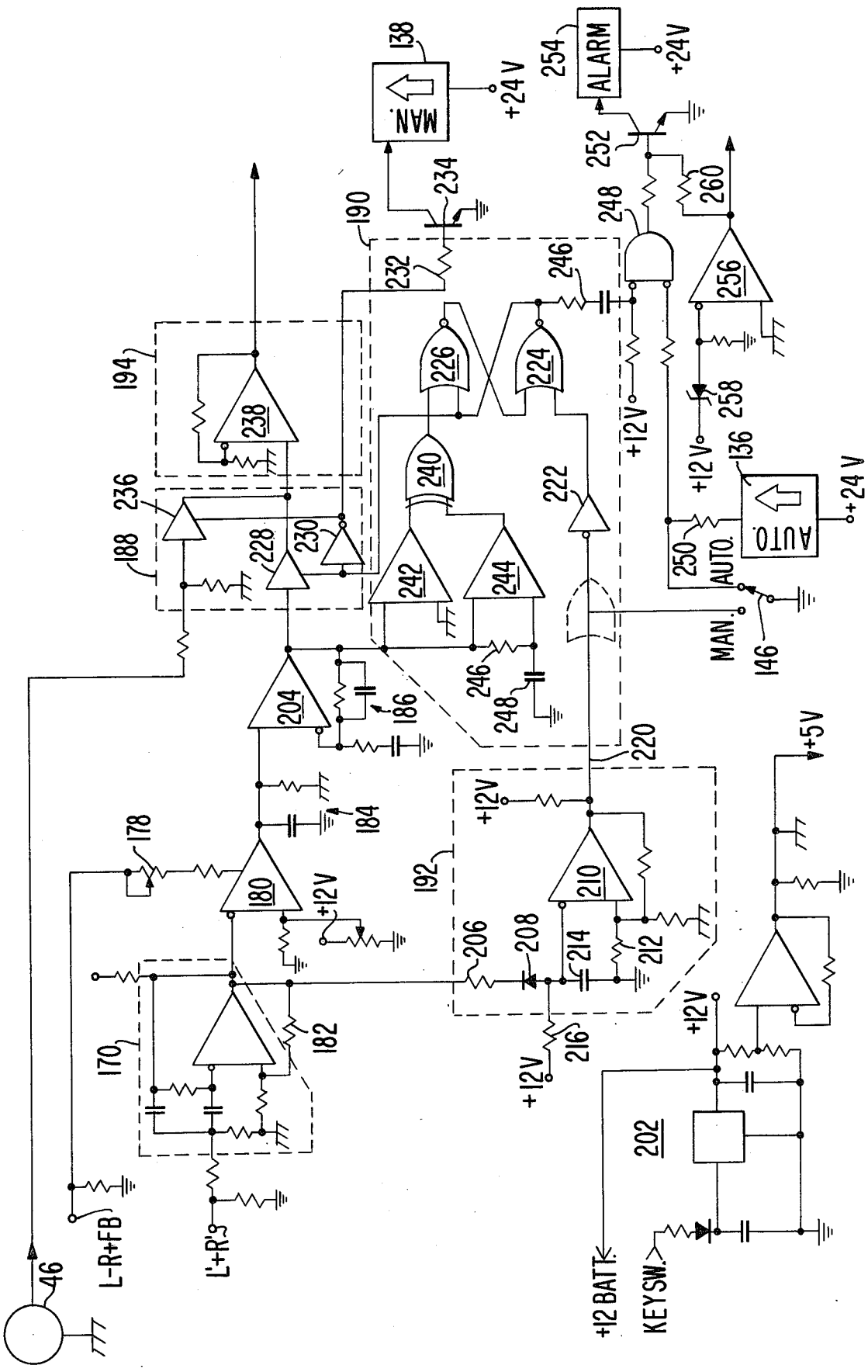
FIGS. 11 and 12 are, together, a detailed schematic diagram of the circuit depicted in block diagram form in FIG. 9.
Figure 12:
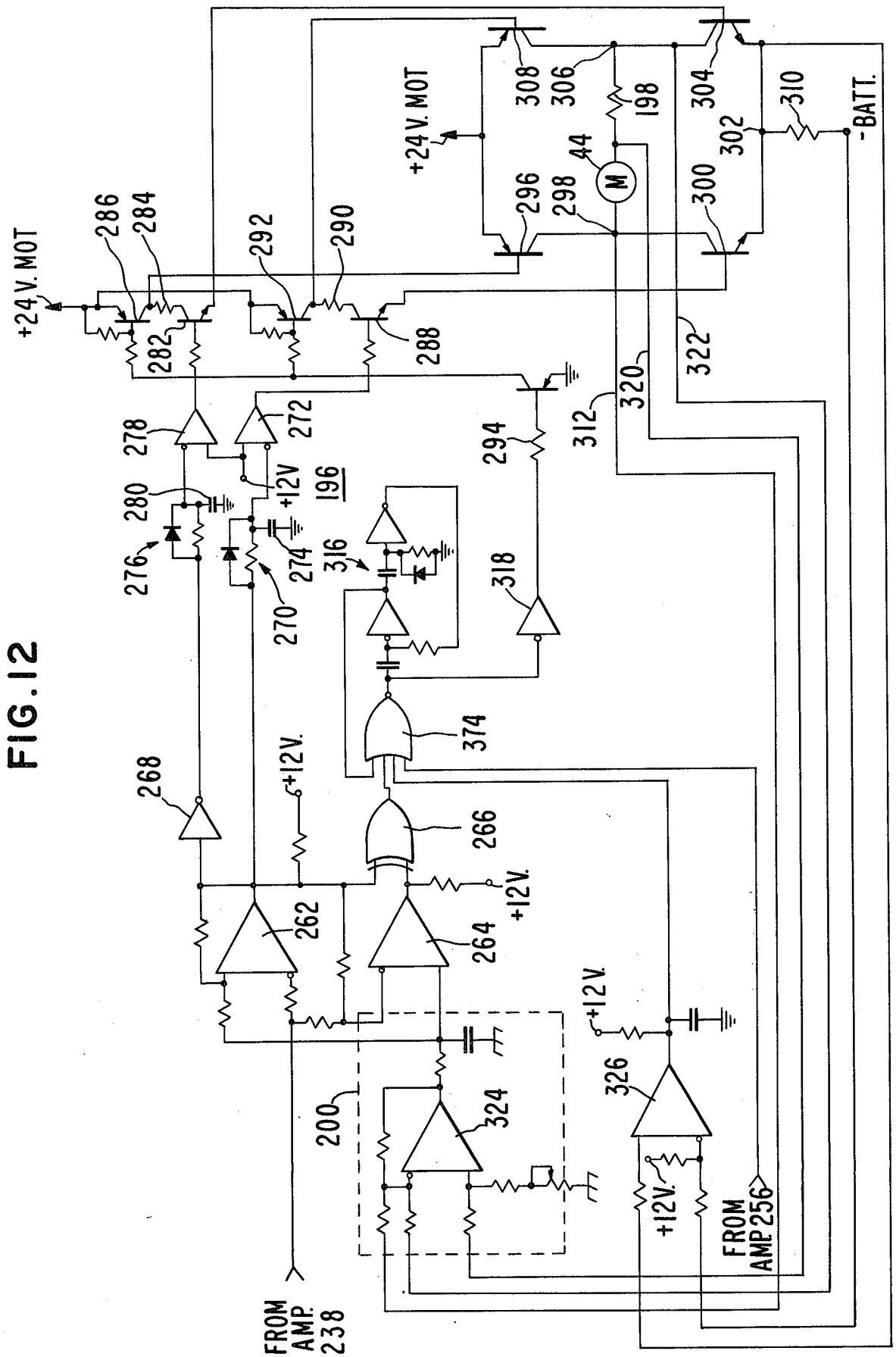

Referring now more particularly to FIGS. 11 and 12, a more detailed description will be given of the circuit depicted in FIG. 9. The same components depicted in FIG. 9 have been encircled with dashed lines and are referred to by the same reference numbers generally. The L'+R' reference signal is fed to the input of the amplifier 170. The differential amplifier 170 is connected as a bandpass filter circuit, corresponding to the 6.3 KHz filter depicted in FIG. 9. The output of the amplifier 170 is fed to one input of a second differential amplifier 180 arranged in the circuit to act as the synchronous detector. The output of the synchronous detector 180 is fed to a low pass 5 Hz filter 184 comprised of a capacitor connected between the output of the synchronous detector 180 and the circuit ground and a resistor connected between the output of the synchronous detector 180 and the signal ground. It should be noted that some of the components in the circuit to be described are connected to the circuit ground while others are connected to the signal ground. The reason for this is, as will be observed in the lower portion of FIG. 11, that the power supply designated generally as 202 has a plus 12 volt output with respect to the circuit ground and a plus 7 volt output connected to the signal ground.

The output of the lowpass filter 184 is supplied to one input of a differential amplifier 204 whose other input is supplied with the output of the lead filter 186 comprised of a parallel RC circuit connected in feedback configuration to the amplifier 204.

The output of the differential amplifier circuit 170 is also supplied to the signal amplitude detector 192 which is comprised of an input resistance 206 connected to the cathode of a diode 208 whose anode is connected to the input of a differential amplifier 210. The other input of the amplifier 210 is connected through a resistance 212 to the circuit ground and through a capacitor 214 to the anode of the diode 208. Plus 12 volts bias is supplied through a resistor 216 to the anode of the diode 208. The output signal from the amplifier 210 may be designated as the threshold signal and it is supplied via a line 220 to the enable logic circuit 190. The "MAN." terminal of the single pole double throw switch 146 is connected to the line 220. The contact arm of the switch 146 is connected to the circuit ground. Thus when the switch 146 is in the "MAN." position the line 220 is grounded and no threshold signal is supplied to the enable logic circuit 190 just as if no threshold signal had been produced. Both of these conditions will be designated for the purposes of this discussion as a logic low.

The line 220 is connected to the input of an inverter 222 whose output is fed to one input of a NOR gate 224. The output of the NOR gate is fed to one input of a second NOR gate 226 and to the controlling input of a CMOS switch 228 and the input of an inverter 230. The other input of the NOR gate 224 is the output of the NOR gate 226. The output of the inverter 230 is connected through a resistance 232 to the base of an NPN transistor 234. The emitter electrode of the transistor 234 is connected to the circuit ground. The LED 138 is connected in series between the plus 24 volt supply and the collector of the transistor 234.

The output of the inverter 230 is also connected to the controlling input of a second CMOS switch 236 whose input is supplied with the output of the power steering tachometer 46. The outputs of the CMOS switches 228 and 236 are combined and fed to one input of a differential amplifier 238.

The other input of the NOR gate 226 is supplied from the output of an exclusive OR gate 240. As will be explained in greater detail hereinafter, the output of the OR gate 240 is a signal representative of whether or not the signs of the slope and polarity of the error signal after synchronous detection are the same to "enable" the logic, i.e. to make the guidance system acquire the buried wire 34.

As was stated before, when the switch 146 is in the manual mode or when no threshold signal is present on the line 220, a logic high is placed on the corresponding input to the NOR gate 224. When this happens the NOR gates 224 and 226 act as a flip-flop in which the high input from the inverter 222 to the NOR gate 224 is an overriding reset. The result is that the output of the NOR gate 224 will be a logic low and the output of the NOR gate 226 will be a logic high regardless of the output of the exclusive OR gate 240. The logic low appearing at the output of the NOR gate 224 will cause the transistor 234 to become conductive to energize the LED 138. This same logic low will also cause the CMOS switch 228 to be open and, because of the inverter 230, the CMOS switch 236 will be closed.

With the CMOS switch 228 open and the CMOS switch 236 closed the output from the power steering tachometer 46 will be fed to the input of the differential amplifier 238. The output of the amplifier 238 may be taken as the velocity command or, in effect the steering control signal to the motor. The polarity of the signal will determine which way the motor control rotates.

If the switch 146 is switched to the auto position, as shown in FIG. 11, and a threshold signal appears on the line 220, the output of the inverter 222 will be a logic low. Assuming that the output from the exclusive OR gate 240 is also a logic low, indicating that the sign of the slope is not equal to the sign of the polarity of the synchronously detected error signal, and that the output of the NOR gate 224 continues to be a logic low, then the output of the NOR gate 226 will be a logic high. At this point, even though the switch 146 is at "AUTO," the OPV 10 will continue under the power steering mode until the signs of the slope and polarity of the modified error signal are equal. When this happens the output of the exclusive OR gate 240 will be a logic high, causing the output of the NOR gate 226 to be a logic low. With two logic lows to the input of the NOR gate 224 its output will change to a logic high and latch the flip flop.

A logic high at the output of the NOR gate 224 will cause the CMOS switch 228 to become conductive and the CMOS switch 236 to become non-conductive. The LED 138 supplied from the output of the inverter 230 will also be extinguished. Thus the input signal to the amplifier 238 will be the guidance control input derived from the sensing coils and the OPV 10 will be steered automatically.

In order to determine the polarity and slope of the error signal the output of the amplifier 204 is fed to one input of an amplifier 242 whose other input is connected to the chassis ground and whose output is fed to one input of the exclusive OR gate 240. The output from the amplifier 204 is also fed to one input of a differential amplifier 244 and, through a resistor 246 to the other input of the differential amplifier 244. This other input is also connected to the circuit ground through a capacitor 248. The output of the amplifier 244 is supplied to the other input of the exclusive OR gate 240. The output of the amplifier 242 is representative of the polarity of the output of the amplifier 204 and the output of the amplifier 244 is representative of the slope of the same signal. When the OPV 10 has come sufficiently close to the buried wire 34 for the threshold signal to be established at the output of the amplifier 210 then the two amplifiers 242 and 244 together with the exclusive OR gate 240 will determine whether the sign of the slope of the error signal is equal to the sign of its polarity, indicating that the OPV 10 is going away from the wire. When this happens the output of the exclusive OR gate 240 will be a logic high.

It should be noted that the guide flip-flop made up of the NOR gates 224 and 226 is effectively a latching flip-flop. Once the flip-flop 224 has gone into the auto mode, it will only reset on a change in state of the signal applied from the output of the inverter 222, which indicates either that the switch 146 has been thrown to the manual mode or that the threshold signal has been lost. Provided the threshold signal is present and the switch 146 is in the auto position, no changes at the output of the exclusive OR gate 240 will affect the state of the flip-flop.

In order to warn the operator that the guide flip-flop has changed state, such as if the threshold signal should somehow be lost, the output from the NOR gate 224 is fed through a series RC circuit 246 to one input of a low true NAND gate 248. This same input of the NAND gate 248 is also supplied with appropriate plus 12 volt bias. The other input of the NAND gate is connected directly to the auto terminal of the switch 146 and through a resistance 250 to the LED 136. The output of the NAND gate 248 is supplied to the base electrode of an NPN transistor 252 whose emitter electrode is connected to the circuit ground and whose collector electrode is connected in series with an alarm 254 to a plus 24 volt source.

In operation, the input to the NAND gate 248 supplied by the switch 146 is a logic low. When the output of the NOR gate 224 also goes to a logic low, indicating that the guide flip-flop has somehow reset itself, then the output of the NAND gate 248 will become a logic high, triggering the alarm 254 through the transistor 252. An amplifier 256 having one lead connected through a diode 258 to the plus 12 volt source and its output connected through a resistance 260 to the base electrode of the transistor 252 will activate the alarm 254 if there is a power failure.

Referring more particularly now to FIG. 12, the velocity command output signal from the amplifier 238 is fed to one input of a comparator 262 and to the corresponding input of a second comparator 264. The output of the amplifier 262 is fed to one input of an exclusive OR gate 266, the input of an inverter 268 and through a parallel diode resistance circuit 270 to one input of an amplifier 272. The same input of the amplifier 272 is connected through a capacitor 274 to the circuit ground. The output of the inverter 268 is connected through a similar parallel diode resistance circuit 276 to one input of an amplifier 278. This same input of the amplifier is connected through a capacitor 280 to the circuit ground. The other inputs of the amplifier 272 and 278 are connected to a plus 12 volt source.

The output of the amplifier 278 is connected to the base electrode of an NPN transistor 282 whose collector electrode is connected through a resistance 284 to the collector electrode of a PNP transistor 286. The emitter electrode of the transistor 286 is connected directly to the plus 24 volt source for the motor. The base electrode of the transistor 286 is forwardly biased through appropriate resistances from the plus 24 volt source.

The output from the amplifier 272 is connected to the base electrode of an NPN transistor 288 whose collector electrode is connected through a resistance 290 to the collector electrode of a PNP transistor 292. The emitter electrode of the transistor 292 is connected directly to the plus 24 volt motor source and its base electrode is forwardly biased by appropriate resistance from the plus 24 volt source. The base electrodes of the transistors 286 and 292 are also connected to the collector electrode of an NPN transistor 294 whose emitter electrode is connected to the circuit ground.

To control the direction of the current supply to the motor the collector electrode of the transistor 286 is connected to the base electrode of a PNP transistor 296 whose emitter electrode is connected to the plus 24 volt motor source. The collector electrode of the transistor 296 is connected to a junction point 298 and to the collector electrode of an NPN transistor 300. The base and emitter electrodes of the transistor 300 are connected to the collector of the transistor 288 and to a junction point 302, respectively. The emitter electrode of the transistor 282 is connected to the base electrode of an NPN transistor 304 whose emitter electrode is connected to the point 302 and whose collector electrode is connected to a junction point 306.

The collector electrode of the transistor 292 is connected to the base electrode of a PNP transistor 308 whose emitter electrode is connected to the plus 24 volt battery source for the motor. The collector electrode of the transistor 308 is connected to the junction point 306. The point 302 is connected in series with a very low resistance wire 310 to the minus terminal of the motor battery. The motor 44 is connected at one side to the junction point 298 and through the resistor 198 to the junction point 306.

The output of the exclusive OR gate 266 is fed to one input of a NOR gate 314. The output of the NOR gate 314 is supplied to a combination of inverters and operational amplifiers designated generally as 316 which convert the NOR gate 314 into a 200 microsecond, one shot multi-vibrator. The output of the NOR gate 314, which is effectively the output of the multi-vibrator, is fed through an inverter 318 to the base electrode of the NPN transistor 294.

If any of the inputs to the NOR gate 314 is a logic high its output is a logic low and the transistor 294 will be conductive to forwardly bias the transistors 286 and 292. When the transistors 286 and 292 are forwardly biased, i.e. conductive, they short together the base and emitter electrodes of the transistors 296 and 308, respectively, making them non-conductive so that the motor will not run. As long as all the inputs to the NOR gate 314 are logic lows, its output will be a logic high and the transistors 286 and 292 will be non-conductive.

Assuming that the output of the amplifier 262 is a logic high, the output of the amplifier 272 will cause the transistor 288 to become conductive thereby making the PNP transistor 308 and the NPN transistor 300 conductive by connecting their base electrodes together through the resistor 290, which can have a value of 600 ohms, for example. It can be seen that this causes a current path to flow from the 24 volt battery source through the resistor 308, the resistor 198, the motor 44, the transistor 300 and the resistor 310 to the minus terminal of the battery. Thus the motor will run in a preordained direction determined by the path of current flow. Similarly, when the output of the amplifier 262 is the equivalent of a logic low, these same transistors will be turned off and, through the inverter 268 and the amplifier 278, the transistors 282, 304 and 296 will become conductive to supply current to the motor 44, though in the opposite direction to cause the motor to rotate in the opposite direction. Thus, the polarity of the output of the amplifier 262 is determinative of the direction in which the motor will run. As will be described in greater detail hereinafter, the polarity of the output signal from the amplifier 262 depends on the polarity of the velocity command signal from the amplifier 238 as well as the output of the electronic tachometer 200.

As explained above in reference to FIG. 9, the electronic tachometer 200 is connected in parallel with the motor and across the resistance 198. As shown in FIG. 12, these connections are made by way of lines 312, 320 and 322 connected to points 298, the junction of the motor and the resistor 198, and the point 306, respectively. The lines 312, 320 and 322 are the three inputs to the electronic tachometer 200, which is comprised of a differential amplifier 324 whose inputs are supplied by the lines connected to the motor and whose output is connected to the inputs of the amplifiers 262 and 264 other than the inputs connected to the output of the amplifier 238. As mentioned above, the outputs of the amplifiers 262 and 264 are supplied to the inputs of an exclusive OR gate 266. The exclusive OR gate acts as a controlled inverter whose output will be low whenever the absolute magnitude of the velocity command signal exceeds the absolute magnitude of the tachometer output signal, provided that the two signals are of the same polarity. If the two signals are of opposite polarity, then the output of the OR gate 266 will be low. For any other condition the output of the OR gate 266 will be a logic high with the result that the motor 44 will be turned off. The minimum time during which the motor 44 will be turned off is approximately 200 microseconds, which is determined by the circuit values within the multi-vibrator circuit 316. The duration during which the motor 44 will be turned on is determined by the length of time required for the output signal from the electronic tachometer 200 to match the velocity command signal from the amplifier 238. In order to guard against the possibility that a pair of series connected power transistors such as transistors 296 and 300 or 308 and 304 might be simultaneously made conducting, the parallel resistor diode circuits 276 and 270 together with their associated capacitors 280 and 274 insure that when there is a change in polarity of the velocity command signal that all the power transistors will be turned off before any other set is turned on.

A differential amplifier 326 has its two inputs connected in parallel with the resistor 310 to act as a torque limiting sensor to shut off the motor in the event that, because of some physical binding in the guide wheel mechanism, the motor is forced to draw an excess of current which would damage the motor. When the voltage across the resistor 310 increases beyond a predetermined value the output of the amplifier 326 reaches what amounts to a logic high which is fed to one input at the NOR gate 314. This logic high will cause the motor to be deenergized. Similarly, the power failure signal from the output of the amplifier 256 is also supplied to one input of the NOR gate 314 to shut off the motor in the event there is a failure in power to the guidance circuit.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An attachment for converting a self-powered vehicle of the type which is manually steered by an operator using a steering wheel connected to one end of a steering column into a manually operable vehicle which can also be selectively guided automatically to follow an external path, the attachment comprising:
   means mounted on the vehicle for sensing the external path and for generating an error signal representative of the deviation of the vehicle from the path,
   tachometer means connected to the steering wheel for generating a steering control signal proportional to the speed of manual rotation of the steering wheel,
   a steering actuator interposed between the steering wheel and the steering column for steering the vehicle by rotating the steering column in response to one of the signals, and manually operable means mechanically connected to the steering wheel for enabling the vehicle operator, by shifting the position of the steering wheel with respect to the steering column, to selectively connect either the sensing means or the steering wheel tachometer means to the steering actuator to supply one of the signals thereto.

2. A guidance attachment for a vehicle as recited in claim 1 wherein the manually operated means for selecting the signal to be supplied to the steering actuator further includes override means for enabling the operator to mechanically connect and disconnect the steering wheel from the steering column while simultaneously disabling the steering actuator, whereby the operator can selectively override the guidance attachment and assume direct manual steering control.

3. A guidance attachment as recited in claim 2 wherein the override means comprises a cylindrical clutch hub affixed to the one end of the steering column, the steering wheel being rotatably mounted about the clutch hub and slidable along its axial length, the steering wheel and clutch hub including means for rotatably engaging the steering wheel to the clutch hub when the steering wheel is slid along the clutch hub to an override position and for disengaging the steering wheel from the clutch hub when the steering wheel is slid along the clutch hub out of the override position.

4. A guidance attachment for modifying a self-powered vehicle of the type having a steering control shaft which is manually operable at one end, into an automatically guided vehicle which, at the vehicle operator's election, will automatically follow an externally defined course, the guidance attachment comprising:
sensor means mounted on the vehicle for generating a sensor signal representative of both the lateral position of the vehicle with respect to the course and the direction of vehicle travel with respect to the course,
steering motor means fitted over the manually operable end of the steering control shaft for moving the shaft to steer the vehicle,
steering circuit means supplied with the sensor signal for generating a first steering control signal for the steering motor means to cause the steering motor means to automatically steer the vehicle along the external course,
the steering circuit means including enabling logic means supplied with the sensor signal for producing an enabling output signal only when the vehicle is moving away from the external course after having come within a predetermined distance thereof under manual steering control, and
switching means supplied with the enabling output signal to supply the first steering control signal to the motor means only after the enabling output signal is generated, whereby the vehicle will become automatically guided along the external course only after it has been manually steered within said predetermined distance.

5. A vehicle guidance attachment as recited in claim 4 wherein said externally defined course comprising an energized guide wire and the attachment further comprises:
coil means within the sensor means and straddling the wire to produce output signals proportional to the vehicle's lateral distance from both sides of the wire, the coil means including means for producing an error signal from the difference of the coil means output signals, and
means within the enabling logic means for triggering in part the enabling output signal when the arithmatic signs of the slope and polarity of the error signal are equal, thereby indicating that the vehicle is moving away from the wire.

6. A vehicle guidance attachment as recited in claim 5 wherein the coil means further includes means for producing a reference signal from the sum of the coil means output signals and the enabling logic means includes means for sensing when the reference signal reaches a predetermined magnitude and for thereafter generating a threshold signal which triggers in part the enabling logic means to produce the enabling output signal.

7. A vehicle guidance device as recited in claim 6 wherein the enabling logic means will continue to produce the enabling output signal when once triggered provided that the threshold signal continues to be generated.

8. A vehicle guidance device as recited in claim 5 wherein the coil means comprise at least a pair of sensing coils on opposite sides of the wire and a multilayered assembly for interconnecting the coils and for mounting the coils horizontally the multilayered assembly including a printed circuit board, a sheet of insulating material, a mu metal strip and a strip of ferrous material, the printed circuit board having a metallic circuit printed thereon and the coils having leads attached to the printed circuit board and interconnected by the printed circuit, the mu metal strip providing a low reluctance return path for lines of magnetic flux generated by the energized wire and passing through the coils.

9. A vehicle guidance device as recited in claim 4 wherein the steering motor means includes an electric motor for moving the steering control shaft and the steering circuit means includes
an electronic tachometer for sensing the voltage drop across the motor and the electrical current flowing through it for generating a tachometer feedback signal representative of the response of the motor to the steering control signal, and
means for subtracting the tachometer feedback signal from the steering control signal before it is supplied to the motor.

10. A guidance device for directing a self-powered vehicle along an externally defined course, the vehicle being of the type having at least one ground engaging steering wheel the guidance device comprising
vehicle mounted sensor means for sensing the position of the vehicle and its course with respect to the externally defined course and for producing an error signal representative of the deviation of the vehicle from the course,
manually operable tachometer means, including a manually rotatable steering member, for generating a power steering control signal proportional to the speed of manual rotation of the steering member,
an actuator supplied with one of the signals for rotating the ground engaging steering wheel to direct the course of the vehicle, and
manually operable means to selectively connect either the sensor means or the tachometer means to the steering actuator to supply one of the signals thereto.

11. A guidance device as recited in claim 10 further comprising manual override means for simultaneously electrically deactivating the actuator and for allowing mechanically direct manual control of the position of the ground engaging steering wheel.

* * * * *